United States Patent Office 3,210,180
Patented Oct. 5, 1965

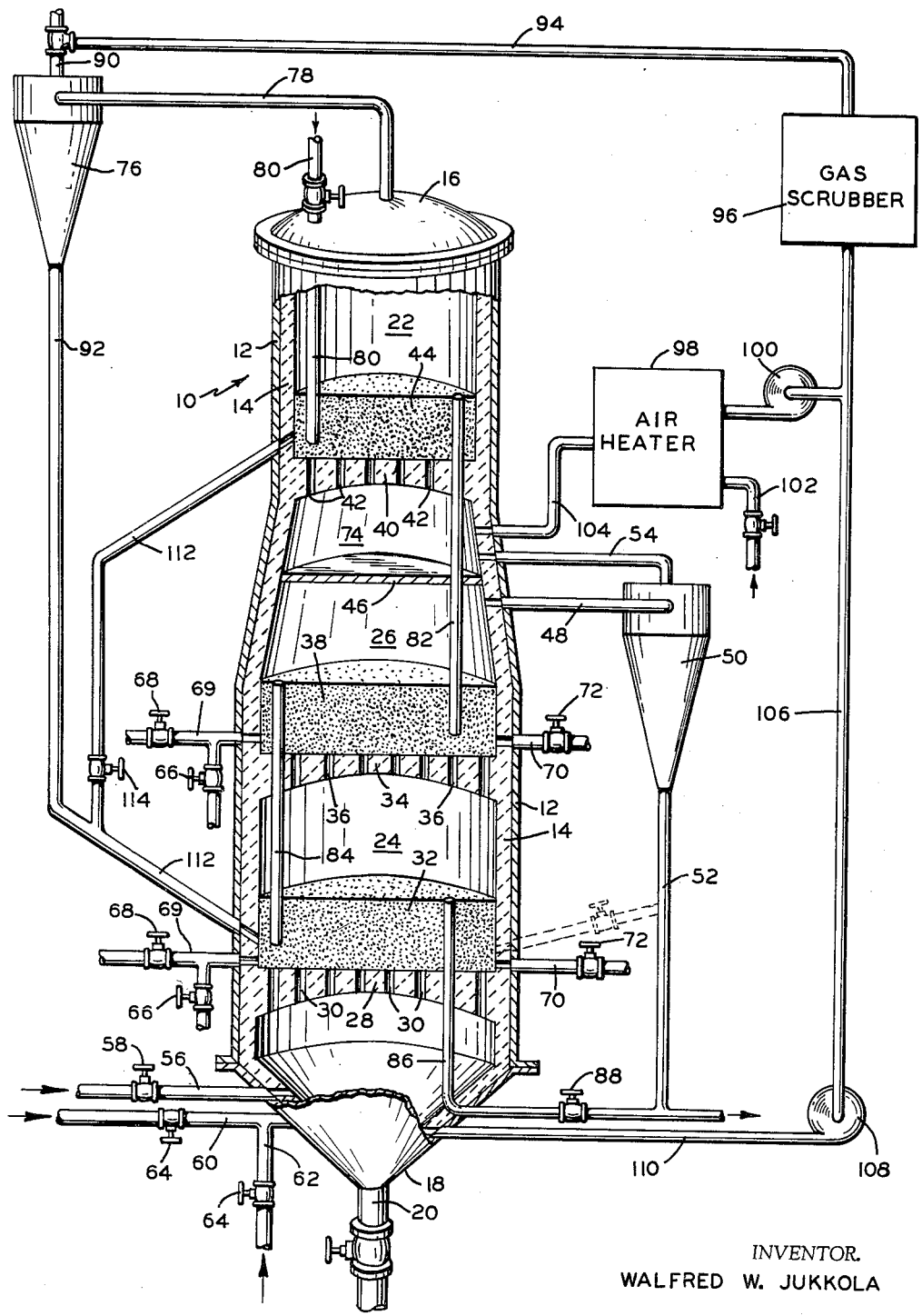
INVENTOR.
WALFRED W. JUKKOLA

3,210,180
TEMPERATURE CONTROL OF IRON ORE
REDUCING FLUIDIZED BEDS
Walfred W. Jukkola, Westport, Conn., assignor to Dorr-Oliver Incorporated, Stamford, Conn., a corporation of Delaware
Filed Dec. 3, 1962, Ser. No. 241,934
7 Claims. (Cl. 75—1)

This invention relates generally to a method of reducing hematite to magnetite in iron-containing ores to permit concentration of such ores by magnetic separation and more particularly to a method wherein the reduction is performed in a fluidized bed into which fuel oil is injected directly into the bed.

It has been proposed in the past to upgrade or concentrate ores containing iron oxides in the form of ferric oxides or hematite ($Fe_2O_3$) by subjecting the ores to the action of reducing gases at elevated temperatures in fluidized bed reactors to convert the ferric oxides to magnetizable forms of iron, such as magnetite ($Fe_3O_4$) or sponge iron. In these prior proposals, reducing gases are produced in separate ovens, such as in catalytic generators, from such fuels as solid coal, liquid hydrocarbons, or natural gas. The reducing gases thus produced in the external ovens are then introduced into the fluidized bed reactor wherein the ore is maintained in a fluidized condition at an elevated temperature. The ensuing reaction reduces all the iron present in the ore to a magnetizable state.

The thus reduced product from the fluidized bed reactor is then subjected to size reduction, as by grinding, to reduce the particle size of the ore to the size of separation. The thus comminuted ore is then separated using magnetic separation into a substantially pure iron-containing fraction (pure in the sense that it is free of all materials except iron or iron oxides) and a second fraction which is substantially iron-free.

By the term "size of separation" is meant a particle size of the ore which results in comminution to such a state that substantially all of a desired material will be found in one group of particles substantially free of contaminants, and substantially all the contaminants or gangue materials will appear in a second group of particles. Thus in the prior practice where the upgrading of iron ores was desired for increasing the iron content, the size of separation would be that size at which all of a first group of particles would contain substantially only iron and iron oxides and all of the second group of particles would be subsatntially free of iron and iron oxides and contain substantially all of the gangue materials or the materials other than iron oxides.

These proposed processes for concentrating ores all required the use of special ovens, such as catalytic generators, for converting the fuels to reducing gases for introduction into the fluidized bed reactor. Such ovens require a high initial investment of capital and further have relatively high operating costs. Further, these ovens are very complex to operate resulting in the additional use of skilled labor.

It is, therefore, an object of this invention to provide an economical method for upgrading iron-containing ores which will eliminate the use of reducing gas generators and the high expense inherently involved in their use.

It has also been proposed to introduce hydrocarbon gas directly into the bed of a fluidized bed reactor to accomplish the reduction of iron oxides to magnetizable form. While this process is very useful, there are many regions in the world where it is desired to upgrade ores where gaseous fuels are relatively non-existent or are so expensive that their use would not be profitable.

Therefore, it is another object of this invention to provide a method of concentrating ores which will make use of relatively inexpensive readily available liquid hydrocarbon fuels.

The aforementioned objects are accomplished principally by reducing at least a portion of the hematite in the ore to magnetite in a heated fluidized bed by the direct injection of liquid hydrocarbon into the fluidized bed along with a quantity of oxygen in the oxygen-containing fluidizing gas which is insufficient for complete combustion of the liquid hydrocarbon. The resulting partial combustion of the liquid hydrocarbon in the fluidized bed (a) produces at least a portion of the heat required to maintain the fluidized bed at its elevated temperature and (b) produces reducing agents of various types which serve to effect the reduction of the hematite to magnetite.

A third object of the invention is to provide a method of concentrating ores which employs direct injection of liquid hydrocarbon fuel into each of the reactant fluidized beds to provide more efficient control and eliminate the necessity of using fluidized combustion zone.

A still further object of the invention is to provide a method of concentrating ores which employs direct injection of liquid hydrocarbon fuels into the reactant fluidized beds and bypasses a portion of the incoming preheated ores into the lowest reactant bed for the purpose of controlling temperature of the bed.

A fifth object of the invention is to provide a method of concentrating ores which utilizes the potential reducing values and heating values of the stack gases.

A sixth object of the invention is to provide a more compact and mroe efficiently controlled fluidized bed reactor.

A still further object of the invention is to provide a method of concentrating ores employing direct injection of liquid hydrocarbon fuel into the reactant fluid bed which is more efficiently controlled, provides a more compact reactor unit, and utilizes the stack gases in a manner to reduce the amount of fuel required.

Other objects and advantages of the invention will become apparent as the specification proceeds to describe the invention with reference to the accompanying drawings, in which;

The figure is a cross-sectional view of a fluidized bed reactor employing the principles of the hereinafter disclosed invention.

Referring now to the drawings there is shown a fluidized bed reactor 10 preferably in the form of a vertical cylinder having a metallic outer wall 12 lined with insulation 14 such as fire brick. The reactor is provided with a top 16 and a curved bottom 18 provided with a valved drain outlet 20. The interior of reactor 10 is provided with an upper preheat zone 22 and preferably with two lower reduction zones 24 and 26. It is within the scope of the invention to have more than two reduction zones but in the preferred embodiment two zones are employed. Preheat zone 22 and reduction zones 24 and 26 are maintained separate from each other but are provided with means for communicating with each other.

Extending across the entire cross-sectional area of reactor 10 adjacent the bottom portion thereof is a first constriction plate 28 with a plurality of apertures 30 therein. Constriction plate 28 is adapted to hold a bed 32 of fluidized ore in the lowest reduction zone 24. Vertically spaced above constriction plate 28 and extending across the entire crosssectional area of reactor 10 is a second constriction plate 34 provided with apertures 36 and which is adapted to hold bed 38 of fluidized ore in the uppermost reduction zone 26. Vertically spaced above construction plate 34 and extending across the entire cross-sectional area of reactor 10 is a third constriction plate 40 with apertures 42 therein adapted to support a bed 44 of fluidized ore in the preheating zone 22. Constriction plates 28, 34, and 40 are all similar in design and construction to each other.

Also extending across the entire cross-sectional area of reactor 10 at a point vertically spaced below restriction plate 40 is an imperforate wall member 46 which serves to prevent the passage of gases directly from reduction zone 26 internally to the preheat zone 22. In order to permit gases rising through bed 38 to reach bed 44 around the wall 46, reactor 10 is provided with a conduit 48 which communicates with the interior of reactor 10 below wall 46 and the interior of conventional dust cyclone 50. Cyclone 50 separates the entrained fines and discharges these fines through outlet conduit 52 and passes the cleansed gas through conduit 54 to a point immediately above imperforate wall 46.

Cone-shaped bottom 18 of reactor 10 is provided with an inlet conduit 56 provided with a valve 58 to control the flow of air into the reactor 10. In addition, coned bottom 18 may be provided with a burner (not shown) attached to liquid hydrocarbon inlet conduit 60 and atomizing fluid conduit inlet 62. Valves 64 are provided for controlling the flow through conduits 60 and 62, as desired. This fuel burner may be any conventional type and is normally used only during start-up in order to bring the fluidized bed reactor 10 up to operating temperatures.

For the purpose of introducing a suitable hydrocarbon liquid fuel into fluidized beds 32 and 38 in reduction zones 24 and 26 respectively, conduits 69 extend through the wall of reactor 10 with the inner open ends thereof disposed in the lower portions of beds 32 and 38. Air under pressure is supplied through conduit 69 under the control of valve 66 and a liquid hydrocarbon fuel under pressure is also fed through conduit 69 under control of a valve 68. The primary purpose of this air supply is to insure proper injection and distribution of the liquid hydrocarbon fuel throughout fluidized beds 32 and 38.

If desired, reactor 10 may be provided with steam inlet conduits 70 under control of valve 72. This steam will react with any carbon which may be deposited to produce carbon monoxide and hydrogen which in turn will assist in the reduction reaction.

While the various inlet conduits to the reactor 10 for introducing substances whether gaseous, liquid, or solid have each been illustrated as single conduits, it is readily apparent that they may likewise be in the form of a plurality of conduits circumferentially disposed around reactor 10 so as to provide more uniform distribution of their contents within the various fluidized bed contained in the various zones in the reactor. Where such a plurality of conduits is used, instead of single conduits as illustrated, it is likewise readily apparent that all of the conduits for introducing any single constituent may be connected to a common manifold.

Looking at the flow of gases through the reactor 10, air or other oxygen containing gas is admitted through inlet conduit 56 to the base of the reactor below the constriction plate 28. The gas then rises through orifices 30 in constriction plate 28 and passes through the fluidized bed 32 in reduction zone 32 and combines with the gas generated therein. The uprising gas then passes through aperture 36 in constriction plate 34 through fluidized bed 38 in reduction zone 26 and combines with the additional gases generated in zone 26. From reduction zone 26 the uprising gas passes through condit 48, dust cyclone 50, conduit 54 into the chamber 74 below constriction plate 40 and above imperforate wall 46. From chamber 74 the combined streams of uprising gases pass through fluidized bed 44 in preheat zone 22 and are delivered to dust cyclone 76 via exhaust conduit 78.

The top 16 of reactor 10 is provided with valved inlet conduit 80 for the introduction of ore into the reactor 10 to be processed. Conduit 80 extends downwardly to a level adjacent constriction plate 40 at the base of fluidized bed 44 in the preheat zone 22. If desired conduit 80 may extend down only to the top level of fluidized bed 44. Passing through constriction plate 40 and imperforate wall 46 is a spill pipe 82 whose upper open end determines the level of fluidized bed 44. Similar to inlet conduit 80 spill pipe extends downwardly to a point adjacent constriction plate 34 at the base of fluidized bed 38 in reduction zone 26. A second spill pipe 84 is provided through constriction plate 34 with the open upper end determining the level of fluidized bed 38 in reduction zone 26. The lower end of spill pipe 84 extends downwardly to a point adjacent constriction plate 28 at the base of fluidized bed 32 in reduction chamber 24. Constriction plate 28 likewise is provided with a spill pipe 86 whose open upper end determines the upper level of fluidized bed 32. Spill pipe 86 extends through conical bottom 18 of reactor 10 to act as an outlet for the reduced ore, and may be supplied with valve 88 to control the flow of ore therethrough. Cyclone outlet conduit 52 is shown connected to spill pipe 86 in order to discharge the separated fines. Alternately, as indicated in dotted lines part or all of the fines from the cyclone dust separator 50 may be discharged into the fluidized bed 32 of the lower reduction chamber 24.

The liquid hydrocarbon fuel introduced into the beds 32 and 38 through conduits 69 is delivered in amounts sufficient to accomplish the desired reduction of the ore in the beds and to supply part or all of the heat required for the process. In this preferred embodiment the largest amount of hydrocarbon fuel is injected into the lower bed 32 since it is desired to accomplish the greatest reduction of the ore in bed 38. The conduit 69 supplying oil to bed 38 as employed only to control the temperatures of the fluidized bed 38. Valves 66 and 68 connected to the feed conduit 69 conveying fuel to fluidized bed 38 may be manually or automatically controlled. If such valves are automatically controlled, such control should be responsive to the temperature of the bed 38 in order to direct the necessary fuel directly to the desired point at the proper time.

The air or other oxygen-containing gas supplied through the bottom 18 of the reactor is supplied in an amount insufficient to support complete combustion of the liquid hydrocarbon injected through conduits 69. Preferably for the strongest possible reduction, the amount of oxygen contained in the gas introduced is only about 40–60% of the oxygen required for the stoichrometric oxidation of the liquid hydrocarbon. To express it differently the amount of liquid hydrocarbon is approximately 1⅔ to 2½ times the stoichrometric quantity oxidizable by the oxygen introduced into the reactor. However, other proportions of oxygen to fuel may be used for particular applications since the strongest possible reduction is not always necessary as partial reduction of the iron-containing particles may be sufficient for some processes. Within reducing beds 32 and 38, which are maintained at an appreciably elevated temperature, partial combustion of the liquid hydrocarbon causes the formation of reducing agents of various types which reduce at least a portion of each of the iron-containing particles to magnetizable state and produces all or part of the heat required for the process.

As indicated previously the preferred reactor employs two reduction zones with liquid hydrocarbon injectors directly connected to each reduction zone to supply liquid hydrocarbon fuel directly into the respective fluidized beds.

Also as previously indicated a plurality of reduction zones may be employed with the scope of the invention but all of such reduction zones necessarily require the direct injection of a liquid hydrocarbon.

In operation the lowest zone or zones, such as fluidized reduction bed 32, is supplied the largest amount of liquid hydrocarbon fuel in order to create a large amount of reducing gas in order to flow such gas into the upper reduction zones to perform the largest percentage of the iron ore reduction. Basically the lower reduction zone or zones is a gasifying zone to produce the necessary reducing gas and to provide the majority of the heat required in the process.

Looking now specifically at the reactor it can readily be seen that the uprising gases through the reactor flow countercurrent to the flow of iron-containing ore in the reactor. The iron-containing ore is introduced into the fluidized bed 44 in preheat chamber 22 via valved inlet conduit 80 where it is preheated to a temperature of approximately 215° F. by the heat still contained in the gases introduced into chamber 74 which flow upwardly through fluidized bed 44 via apertures 42 in constriction plate 40. These gases primarily are spent gases delivered from the reduction zone 26 through the dust cyclone 50. Another additional source of recoverable heat which can be employed for preheating the ore is the gases exhausted from the reactor 10 through the exhaust conduit 78. As indicated in the drawings the cool stack gases are separated in dust cyclone 78 with stack gases being discharged from the cyclone 76 through conduit 90. The entrained solid fines are discharged downwardly from the cyclone 76 through conduit 92. The stack gases in conduit 90 have some potential reducing power and retain some fuel value. To recover a portion of these values any desired volume of these stack gases can be recycled to the reactor 10. As shown a portion of these gases are delivered through conduit 94 to a gas scrubber 96, wherein the gases are cleaned. A portion of the gases from the gas scrubber 96 are delivered to an air heater 98 by fan means 100 and burned with the proper amount of air introduced through air conduit 102. The products of combustion are then delivered from air heater 98 to chamber 74 through conduit 104 and mixed with the spent gases from the reduction zone 26 to provide additional heat for the purposes of preheating the ore in preheat chamber 22.

The remaining portion of the cleaned stack gases are delivered into the coned bottom 18 of the reactor 10 via conduit 106, fan means 108, and conduit 110 in order to utilize the reducing power therein and provide a means for closer control of the reactor. Such recycled gases lower the temperature of the fluidized bed 32.

Preheated iron-containing ores in the preheat chamber overflow into the spill pipe 82 wherein they are delivered to the bottom of fluidized bed 38 of reduction zone 26. Preferably, approximately 90% of the desired reduction of the ore is accomplished in this zone. The ore then overflows into the spill pipe 84 and is delivered into the bottom of fluidized bed 32 in reduction zone 24 wherein the final 10% of the desired reduction takes place. Preferably the temperature in the reduction zones 24 and 26 is maintained at approximately 1200° F. but can be within the range of 1100° F.–1700° F.

It has been found in this type of process that the temperature of the second stage reduction zone 24 was exceeding the desired predetermined limits. To maintain proper temperatures in the second stage reduction zone comparatively cool ore is supplied directly from preheat chamber 22 through bypass conduit 112 to fluidized bed 32 in reduction zone 24. The cool fines in the stack gas may also be mixed with such bypass ore, if desired. At the same time the cool clean stack gas in conduit 110 is also supplied to reduction zone 24 through apertures 30 in the constriction plate 28. Preferably, a constant volume of clean stack gas should be supplied to the second stage reduction chamber so that the temperature of the fluidized bed 32 can be directly controlled by adjusting the valve means 114 to control the amount of bypassed ore. Valve means 114 can be either manually or automatically operated. If the valve means 114 is automatically operated it is preferred that its operation be directly responsive to the temperature of the bed 32 in order to provide efficient and instant response.

It should be noted that preheating chamber 22 is basically a classifying chamber in that the fine ore is carried off in the stack gases and is delivered to the second stage reduction chamber 24 through conduit 92 while the larger particles of ore are supplied to the first storage reduction chamber 26 through spill pipe 82. In other words the larger harder to reduce iron-containing ores go through a two stage reduction while the more readily reduced fine iron-containing ores are subjected to only one stage of reduction.

The herein disclosed process and apparatus efficiently and readily with a minimum amount of equipment convert hematite ores to magnetite by direct injection of a liquid hydrocarbon into a plurality of fluidized beds. The disclosed process allows the reactor to be reduced in size by the elimination of a combustion chamber and at the same time provides control of the bed temperatures. On a large size fluidized reactor, it is possible to reduce the height of such reactor by about 20 feet because of the elimination of the combustion chamber. The disclosed process also permits the reactor to handle ores with higher moisture content and also to preheat the incoming ores to a higher temperature by use of the potential fuel and reducing values in the stack gases.

Although I have described specifically the preferred embodiment of my invention, I contemplate that changes may be made without departing from the scope or spirit of my invention and I desire to be limited only by the scope of the claims.

I claim:

1. The process for treating iron-containing ores to reduce the hematite to magnetite in a reactor having a plurality of superposed fluidized zones comprising the steps establishing and maintaining in a vertical substantially cylindrical vessel at least three superposed fluidized zones of iron-containing ore of which in the lower two zones reduction conditions are maintained and in the upper zone solids preheating conditions are maintained, introducing into the lowest reduction zone an oxygen containing gas and a liquid hydrocarbon fuel, said gas containing insufficient oxygen for complete combustion of said liquid hydrocarbon fuel, maintaining said lowest zone at a temperature sufficiently elevated to cause partial oxidation of said liquid hydrocarbon fuel with said oxygen containing gas in the presence of said iron-containing ore thereby producing reducing agents for reducing said hematite to magnetite and at least a portion of the heat for maintaining the iron-containing ore at the reduction temperature, successively passing said partially combusted gases upward through said intermediate reduction zone and said preheating zone to partially reduce the iron-containing ore in said intermediate reduction zone and to preheat the incoming iron-containing ore being supplied to said preheat zone, said incoming iron-containing ore passing from said preheat zone downwardly through said intermediate reduction zone into said lower reduction zone wherein the desired reduction of the iron-containing ores is completed, discharging said reduced ore from said lower reduction zone, introducing into said intermediate reduction zone a liquid hydrocarbon fuel whenever the temperature of said reduction zone has dropped below a predetermined minimum, discharging spent fluidizing gases from said preheat zone, said gases containing residual reducing agents and potential heat values, and utilizing said heat value in said preheat zone by burning a portion of said discharge gases whereby the heat generated by said heat values is mixed with the upflowing gases from said intermediate reduction zone and supplied into said preheat zone.

2. Process according to claim 1 wherein another portion of said discharge gases is recycled into said lower reduction zone thereby utilizing residual reducing agents to reduce hematite to magnetite.

3. Process according to claim 1 wherein a portion of discharge gases is controllably recycled into said lower reduction zone to control the temperature therein.

4. The process of claim 3 wherein a portion of said incoming iron-containing ore is supplied directly to said lower reduction zone bypassing said intermediate reduction zone to further lower the temperature of said lower reduction zone.

5. The process of claim 4 wherein said discharge gas supplied to said lower reduction zone is supplied in a constant volume, and said supply of iron-containing ore bypassing said intermediate reduction zone is supplied at a controlled rate to control the temperature of said lower reduction zone.

6. The process for treating iron-containing ores to reduce the hematite to magnetite in a reactor having a plurality of superposed fluidized zones comprising the steps establishing and maintaining in a vertical substantially cylindrical vessel at least three superposed fluidized zones of iron-containing ore of which in the lower two zones reduction conditions are maintained and in the upper zone solids preheating conditions are maintained, introducing into the lowest reduction zone an oxygen containing gas and a liquid hydrocarbon fuel, said gas containing insufficient oxygen for complete combustion of said liquid hydrocarbon fuel, maintaining said lowest reduction zone at a temperature sufficiently elevated to cause partial oxidation of said liquid hydrocarbon fuel with said oxygen containing gas in the presence of said iron-containing ore thereby producing reducing agents for reducing said hematite to magnetite and at least a portion of the heat for maintaining the iron-containing ore at reduction temperatures, successfully passing said partially combusted gases upward through said intermediate reduction zone and said preheating zone to partially reduce the iron-containing ore in said intermediate reduction zone and to preheat the incoming iron-containing ore being supplied to said preheat zone, said incoming iron-containing ore passing from said preheat zone downwardly through said intermediate reduction zone into said lower reduction zone wherein the desired reduction of the iron-containing ores is completed, discharging said reduced ore from said lower reduction zone, introducing into said intermediate reaction zone a liquid hydrocarbon fuel whenever the temperature of said reduction zone has dropped below a predetermined minimum, discharging spent fluidizing gases from said preheat zone, said gases containing residual reducing agents and potential heat values and recycling a portion of said discharge gases into said lower reduction zone thereby utilizing said residual reducing agents to reduce hematite to magnetite.

7. Process according to claim 6 wherein the recycled discharge gases containing residual reducing agents are controllably introduced into said lower reduction zone for controlling the temperature therein.

References Cited by the Examiner

UNITED STATES PATENTS

| | | | |
|---|---|---|---|
| 2,204,576 | 6/40 | Davis | 75—1 X |
| 2,477,454 | 7/49 | Heath | 75—26 X |
| 2,900,236 | 8/59 | Speed et al. | 75—33 X |
| 2,990,269 | 6/61 | Hyde | 75—26 |
| 3,020,149 | 2/62 | Old et al. | 75—26 |

BENJAMIN HENKIN, *Primary Examiner.*